US008504836B2

(12) United States Patent  (10) Patent No.: US 8,504,836 B2
Zhang et al.  (45) Date of Patent: Aug. 6, 2013

(54) SECURE AND EFFICIENT DOMAIN KEY DISTRIBUTION FOR DEVICE REGISTRATION

(75) Inventors: Jiang Zhang, La Jolla, CA (US); Alexander Medvinsky, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 1105 days.

(21) Appl. No.: 12/344,997

(22) Filed: Dec. 29, 2008

(65) Prior Publication Data

US 2010/0169646 A1  Jul. 1, 2010

(51) Int. Cl.
*H04L 9/32* (2006.01)
*G06F 21/00* (2006.01)
*G06F 15/16* (2006.01)
*G06F 7/04* (2006.01)
*H04K 1/00* (2006.01)

(52) U.S. Cl.
USPC ........... 713/169; 713/168; 713/170; 713/171; 713/184; 726/3; 726/4; 726/5; 726/27; 726/29; 709/223; 709/225; 380/255; 380/270

(58) Field of Classification Search
USPC ................. 713/168–172, 182–185; 380/277, 380/255, 259–262, 270; 726/2–10, 26–29; 709/223–229
See application file for complete search history.

(56) References Cited

U.S. PATENT DOCUMENTS

| 5,909,183 | A | 6/1999 | Borgstahl et al. |
| 6,084,512 | A | 7/2000 | Elberty et al. |
| 6,199,136 | B1 | 3/2001 | Shteyn |
| 6,826,607 | B1 | 11/2004 | Gelvin et al. |
| 6,983,370 | B2 | 1/2006 | Eaton et al. |
| 6,995,655 | B2 | 2/2006 | Ertin et al. |
| 7,020,121 | B2 | 3/2006 | Hardacker et al. |
| 7,092,670 | B2 | 8/2006 | Tanaka et al. |
| 7,511,765 | B2 | 3/2009 | Ono |
| 7,613,426 | B2 | 11/2009 | Kuehnel et al. |
| 7,912,076 | B2 | 3/2011 | Kim et al. |
| 8,001,381 | B2 * | 8/2011 | Metke et al. .................. 713/169 |
| 8,001,584 | B2 * | 8/2011 | Lortz et al. ........................ 726/5 |
| 8,014,355 | B2 | 9/2011 | Koga |
| 8,185,049 | B2 | 5/2012 | Zhang et al. |
| 8,189,627 | B2 | 5/2012 | Xia et al. |

(Continued)

FOREIGN PATENT DOCUMENTS

EP  1710656 A1  10/2006
JP  2008/035517 A  2/2008

(Continued)

OTHER PUBLICATIONS

PCT Search Report & Written Opinion, RE: Application # PCT/US2009/066178 Jun. 22, 2010.

(Continued)

*Primary Examiner* — Tae Kim

(57) ABSTRACT

A domain key is securely distributed from a device in an existing network to a device outside the network. Each device generates the session key on its own using the first random number, the second random number, the Personal Identification Number, and the same key generation function. The device in the existing network sends the domain key encrypted with the session key to the other device.

20 Claims, 6 Drawing Sheets

U.S. PATENT DOCUMENTS

| | | | |
|---|---|---|---|
| 8,239,551 B2* | 8/2012 | Oda et al. | 709/228 |
| 8,276,209 B2 | 9/2012 | Knibbeler et al. | |
| 2002/0077077 A1 | 6/2002 | Rezvani et al. | |
| 2003/0095521 A1 | 5/2003 | Haller et al. | |
| 2005/0014503 A1 | 1/2005 | Nakakita et al. | |
| 2005/0210261 A1 | 9/2005 | Kamperman et al. | |
| 2006/0116107 A1* | 6/2006 | Hulvey | 455/411 |
| 2006/0156340 A1 | 7/2006 | Choi | |
| 2006/0177066 A1* | 8/2006 | Han et al. | 380/277 |
| 2006/0224893 A1 | 10/2006 | Sales et al. | |
| 2006/0288209 A1 | 12/2006 | Vogler | |
| 2007/0079362 A1* | 4/2007 | Lortz et al. | 726/5 |
| 2007/0106894 A1 | 5/2007 | Zhang et al. | |
| 2007/0107020 A1 | 5/2007 | Tavares | |
| 2007/0141986 A1 | 6/2007 | Kuehnel et al. | |
| 2007/0150720 A1 | 6/2007 | Oh et al. | |
| 2007/0178884 A1 | 8/2007 | Donovan et al. | |
| 2008/0066120 A1 | 3/2008 | Igoe | |
| 2008/0079601 A1 | 4/2008 | Ishihara et al. | |
| 2008/0123739 A1 | 5/2008 | Reznic et al. | |
| 2008/0134309 A1 | 6/2008 | Qin et al. | |
| 2008/0250147 A1 | 10/2008 | Knibbeler et al. | |
| 2008/0313462 A1* | 12/2008 | Zhao et al. | 713/170 |
| 2009/0061835 A1* | 3/2009 | Schmidt et al. | 455/414.2 |
| 2009/0103471 A1* | 4/2009 | Candelore | 370/315 |
| 2009/0122201 A1 | 5/2009 | Freundlich et al. | |
| 2009/0132941 A1* | 5/2009 | Pilskalns et al. | 715/764 |
| 2009/0157521 A1* | 6/2009 | Moren et al. | 705/26 |
| 2009/0177511 A1* | 7/2009 | Shaw et al. | 705/7 |
| 2009/0217043 A1* | 8/2009 | Metke et al. | 713/171 |
| 2009/0235304 A1 | 9/2009 | Hardacker et al. | |
| 2009/0240941 A1* | 9/2009 | Lee et al. | 713/169 |
| 2009/0241040 A1* | 9/2009 | Mattila et al. | 715/760 |
| 2009/0247197 A1* | 10/2009 | Graff et al. | 455/466 |
| 2009/0322948 A1 | 12/2009 | Funabiki et al. | |
| 2010/0030904 A1* | 2/2010 | Oda et al. | 709/228 |
| 2010/0071010 A1 | 3/2010 | Elnathan et al. | |
| 2010/0135259 A1* | 6/2010 | Lee et al. | 370/336 |
| 2010/0164693 A1 | 7/2010 | Zhang et al. | |
| 2010/0169399 A1 | 7/2010 | Moroney et al. | |
| 2010/0325654 A1 | 12/2010 | Moroney et al. | |
| 2011/0047583 A1* | 2/2011 | Howard et al. | 725/109 |
| 2011/0268274 A1 | 11/2011 | Qiu et al. | |

FOREIGN PATENT DOCUMENTS

| | | |
|---|---|---|
| KR | 100703018 B1 | 10/2006 |
| KR | 10-2006-00113926 A | 11/2006 |
| KR | 10-0778477 B1 | 11/2007 |
| WO | 2007094347 A1 | 8/2007 |
| WO | 2008-002081 A1 | 1/2008 |

OTHER PUBLICATIONS

A. Menezes, et al, "Handbook of Applied Cryptography", 1996; Chapter 12, pp. 489-541 (see pp. 497-498; 508-511).

PCT Search Report & Written Opinion, Re: Application #PCT/US2009/066529; Jun. 28, 2010.

PCT Search Report & Written Opinion, RE: Application #PCT/US2009/065670; Jun. 29, 2010.

PCT Search Report & Written Opinion, RE: Application #PCT/US2009/066174; Jun. 23, 2010.

Soriente, et al, "BEDA: Button-Enabled Device Association", First International Worshop on Security for Spontaneous Interaction; Sep. 2007.

"Wireless Home Digital Interface:" accessed at http://www.whdi.org/Technology/, accessed on Mar. 25, 2010, pp. 2.

Barker, E, and Kelsey, J., "Recommendation for Random Number Generation Using Deterministic Random Bit Generators (Revised)," NISY Special Publication 800-90, pp. 133 (2007).

International Search Report and Written Opinion for International Application No. PCT/US2010/038963, European Patent Office, The Hague, Netherlands, mailed on Sep. 22, 2010.

* cited by examiner

US 8,504,836 B2

SECURE AND EFFICIENT DOMAIN KEY DISTRIBUTION FOR DEVICE REGISTRATION

RELATED APPLICATIONS

The present invention is related to U.S. patent application Ser. No. 12/345,010, entitled "Personal Identification Number (PIN) Generation between Two Devices in a Network", by Paul Moroney and Jiang Zhang; U.S. patent application Ser. No. 12/344,994, entitled "Method of Targeted Discovery of Devices in a Network", by Jiang Zhang and Petr Peterka; and U.S. patent application Ser. No. 12/345,002, entitled "Multi-Mode Device Registration", by Jiang Zhang and Petr Peterka, all of which are incorporated by reference in their entireties.

BACKGROUND

The WIRELESS HOME DIGITAL INTERFACE (WHDI) is a wireless standard proposed for a wireless multimedia device network, which may be used at home, in the office or in other short-range wireless network environments. WHDI allows for high bandwidth wireless channels for sending content between devices, which may support uncompressed High Definition (HD) content. For example, a DVD player may be connected to multiple HDTVs wirelessly and send uncompressed content to the HDTVs using WHDI. WHDI eliminates the need for cabling, such as High Definition Multimedia Interface (HDMI) cables, component cables, etc., used to transmit uncompressed content between devices. Conventional wireless technologies such as 802.11, BLUETOOTH, etc., do not have the bandwidth or interface to transmit uncompressed multimedia content between devices.

WHDI can be used in various environments. For example, a user located in a single family home or in an apartment may connect a DVD player, an MP3 player, a laptop/notebook or desktop personal computer (PC), a gaming console, and flat panel TVs all together, wirelessly, using WHDI. In another environment, a user wirelessly connects a multimedia projector in a conference room to a desktop PC in his office, and to a set of notebook computers of numerous meeting participants using WHDI. In these examples and other examples, security is a concern because of the wireless communication between the WHDI devices. Due to the nature of wireless networks, typically they are easy to identify by unauthorized users. Also, an unauthorized user may attempt to identify and connect to the particular devices connected in a home WHDI network. The homeowner may desire to keep the identity of their devices private and their devices away from the unauthorized users. For example, a homeowner may not want a neighbor to know they have five HDTVs, or they may not want any non-family members to know they have a server connected to their home network because the server may contain confidential information, such as personal videos, etc. While WHDI provides the protocol and interfaces for high-bandwidth wireless networks, WHDI may lack the security procedures to maintain user privacy. The present invention provides methods of secure and efficient domain key distribution for device registration in a WHDI network.

BRIEF DESCRIPTION OF THE DRAWINGS

Features of the present invention will become apparent to those skilled in the art from the following description with reference to the figures, in which.

DETAILED DESCRIPTION

Figure 1:
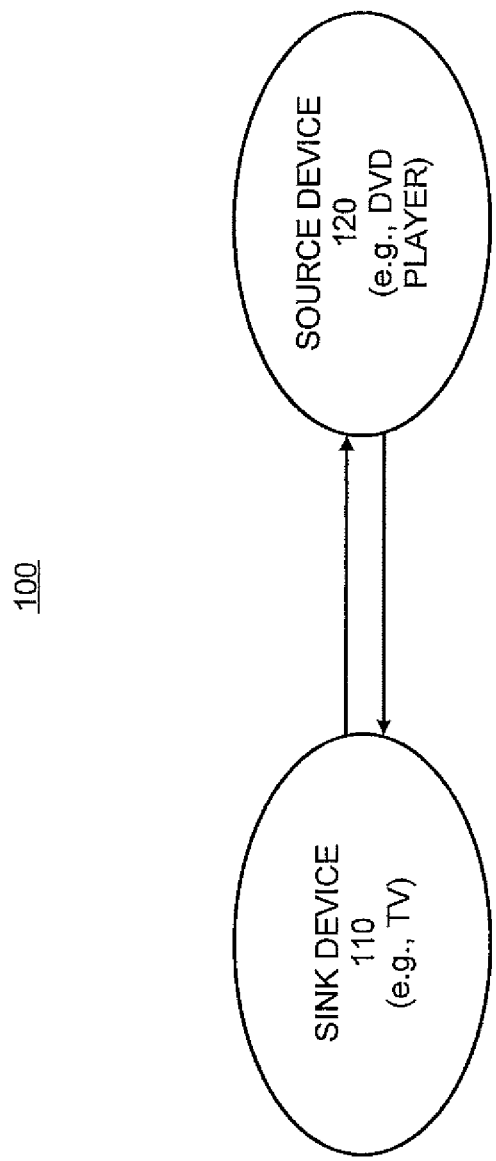
FIG. 1 illustrates a simplified block diagram of devices in a Wireless Home Digital Interface network, according to an embodiment of the present invention.

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Embodiments of the present invention provide a secure, efficient and user-friendly method and system for verifying device certificate, generating Personal Identification Numbers (PINs), exchanging a device registration key and delivering the domain key among the different devices in a wireless network, in particular, a WHDI network in which the WHDI environment provides a set of security functions. In this method, the four functions can be implemented within four transactions ingeniously, which makes the protocol more efficient than the traditional way.

WHDI is a proposed standard for high bandwidth wireless digital data connectivity between multiple points. WHDI wirelessly transmits multimedia data, such as high definition video and the associated audio data, from source devices to sink devices in the WHDI network reliably. Devices in a WHDI network are referred to as WHDI devices, and a WHDI network includes WHDI devices communicating wirelessly amongst each other using the WHDI standard. WHDI devices are characterized as two types. One type is a source device and the other type is a sink device. A WHDI device may be a source device, a sink device, or both depending on its functionality. A source device transmits data streams across a WHDI network to a sink device, and a sink device receives data streams across the WHDI network from the source device. Examples of source devices are set-top box, notebook Personal Computer (PC), desktop PC, DVD player, MP3 player, video camcorder, audio/video receiver, gaming console, etc. Examples of sink device are TVs, PCs, projectors, etc.

Many device networking technologies including WHDI face the issue of how to securely allow a new device to become part of any existing network. According to an embodiment, a Personal Identification Number (PIN) is used during a device registration process to allow a new device to become part of the network. The device registration is a process to let a new device join another device or a network of devices in a domain. A domain is a group of devices that are approved to share content with each other. Device registration or domain registration includes the process of approving or denying a device to join a device or a domain. Device registration can provide a user with control over which devices are allowed to connect to his/her device(s) or join his/her domain. So if a family has a domain, then all the devices owned by the family may be members of the domain, but a friend's device may not be allowed to join the domain.

Prior to a new device being allowed to connect to an existing device or join a domain, the new device must be authorized or pre-approved to ensure that the new device is a device that a user wants to connect to the existing device or be in the domain. The new device first needs to be verified if it is a WHDI standard compliant device. Whether a device is a WHDI standard compliant device can be verified by an existence of a valid WHDI certificate, which was issued by WHDI certificate authority to the device. For example, a family member purchases a new TV, and the family member wants the TV to become part of the family domain, so the TV can play content received from other devices in the family domain, such as a set-top box or a DVD player. However, if a neighbor purchases a TV, the family member likely does not want the neighbor's TV in the family's domain. Furthermore, through a wireless network, the neighbor's TV may inadvertently attempt to become part of the family domain. In order to limit this possibility, a PIN generation method is described in U.S. patent application Ser. No. 12/345,010, entitled "Personal Identification Number (PIN) Generation between Two Devices in a Network", by Paul Moroney and Jiang Zhang to determine whether a new device is authorized to join a domain. The PIN may also be used to generate a device registration key, which is used to securely distribute the domain key that is used by the new device to join the domain.

After a device is determined to be authorized, for example, through exchange of WHDI certificates, according to an embodiment, the PIN is used to generate a device registration key (also referred to as a session key). The session key is used to securely distribute a domain key to a new authorized device, so the new device can join the domain. According to an embodiment, the session key is normally generated using some random numbers. Three random numbers may be used to generate the session key, where the third random number may be the PIN or another random number.

FIG. 1 illustrates a simplified block diagram of devices in a WHDI network 100, according to an embodiment of the present invention. FIG. 1 shows a sink device 110 and a source device 120. In one example, the sink device 110 is a TV, and the source device 120 is a DVD player. It will be apparent that the WHDI network 100 may include additional sink devices and/or additional source devices. The source device 120 may be a source of content. Content may include video content, audio content, or other data content, which may be from the Internet. More than one source device may be connected to more than one sink device simultaneously (e.g., for multicasting) or separately (e.g., unicasting). Examples of source devices and sink devices include a DVD player, an MP3 player, PC, a gaming console, TV, server, etc.

When the sink device 110 attempts to connect to the source device 120 wirelessly within the WHDI network 100 for the first time, the sink device 110 needs to know whether the source device 120 is a secure device for the sink device 110. Also the source device 120 needs to know whether the sink device 110 is a secure device. Secure device means that the device is a WHDI standard compliant device and the device is authorized to connect to the other device. Whether a device is a WHDI standard compliant device can be verified by an existence of a valid WHDI certificate, which was issued by WHDI certificate authority to the device. For example, an authorized device may be a device not owned by a family member, such as a neighbor's device or a friend's device. Because the neighbor's device or a friend's device may come within range of the WHDI network 100, these unauthorized devices may advertently or inadvertently attempt to join the family domain. An example of a new authorized device may be a new TV purchased by the family.

According to an embodiment, a PIN generation procedure is used to distinguish unauthorized devices from an authorized device. That is, one way of verifying whether the other device is a secure device is that the sink device 110 generates a PIN for the source device 120 using a method described in further detail below. At the same time, the source device 120 also verifies whether the sink device 110 is a secure device for it by validating the sink device 110's certificate and optionally whether the generated PINs are matching. For example, PIN generation can be accomplished by entering any input choices, such as pressing particular buttons on the source device 120, pressing buttons in a particular sequence on the source device 120, etc., in response to one or more instructions from the first sink device 110. This way, a user who wants to connect a new device to an existing WHDI device has a simplified method of PIN generation and entry for the existing WHDI device, for example, by using the interface on the WHDI device.

In addition, when the WHDI device generates a one-time random PIN for the new device for security purposes, it is more secure and user-friendly to let the devices generate a PIN at runtime than using a specific PIN already pre-assigned for a particular source device, because it reduces the possibility of the PIN being stolen or the PIN being forgotten by the user. With respect to the certificate validation, a WHDI device will initially be loaded with a certificate in the factory as well as the device's identification. Thus, the WHDI device certificates of both devices have to be validated first. After validating each other's certificate, each device also gets the other device's public key, which can be used to encrypt and protect the data transmitted between these two devices.

In FIG. 1, the sink device 110 generates a PIN for the source device 120 based on the type of inputs at the source device 120, such as press-able buttons, or other user input options. The source device 120 can also take part in the PIN generation process by providing some random values to the sink device 110. These random data can be encrypted using the sink device 110's public key and the sink device 110 can decrypt it using its own private key. Once the sink device 110 generates a PIN for the source device 120, the PIN or information needed to generate the PIN is communicated to the source device 120 through the user. After the sink device 110 generates the PIN, indicates user entries, and they are entered at the source device, and the generated PIN is the same, the devices may register with each other and the new device may join the existing domain in the WHDI network 100. The domain is used in WHDI to define one or more WHDI devices that a particular WHDI device is authorized to send and/or receive content. This entire PIN generation process is a user friendly and secure method. This PIN generation method may be performed using a Graphical User Interface (GUI) displayed on one or more of the WHDI devices. Also, an administrative GUI may be provided to manage domains.

The WHDI network 100 also provides the ability to stream the persistently-stored content from the initial source device to another sink device, or from the initial source device to another source device that has been authenticated as part of the WHDI network. In one embodiment, this allows a media server as a source device, e.g., a dual-tuner set-top box ("STB") with hard drive, to deliver recorded content to any sink device such as TV, in the house by streaming to a targeted sink device such as HDTV. Of course, it is noted that while a home network is described, extensions to a business, education, public entertainment or other such local wireless network are analogous.

An embodiment of a method in which the WHDI network 100 may be employed for generating a PIN among different WHDI devices will now be described with respect to the following flow diagram of the method 200 depicted in FIG. 2. It should be apparent to those of ordinary skill in the art that the method 200 represents a generalized illustration and that other steps may be added or existing steps may be removed, modified or rearranged without departing from the scopes of the method 200. Also, the method 200 is described with respect to the WHDI network 100 by way of example and not limitation, and the method 200 may be used in other systems or other types of networks, wired or wireless.

Figure 2:
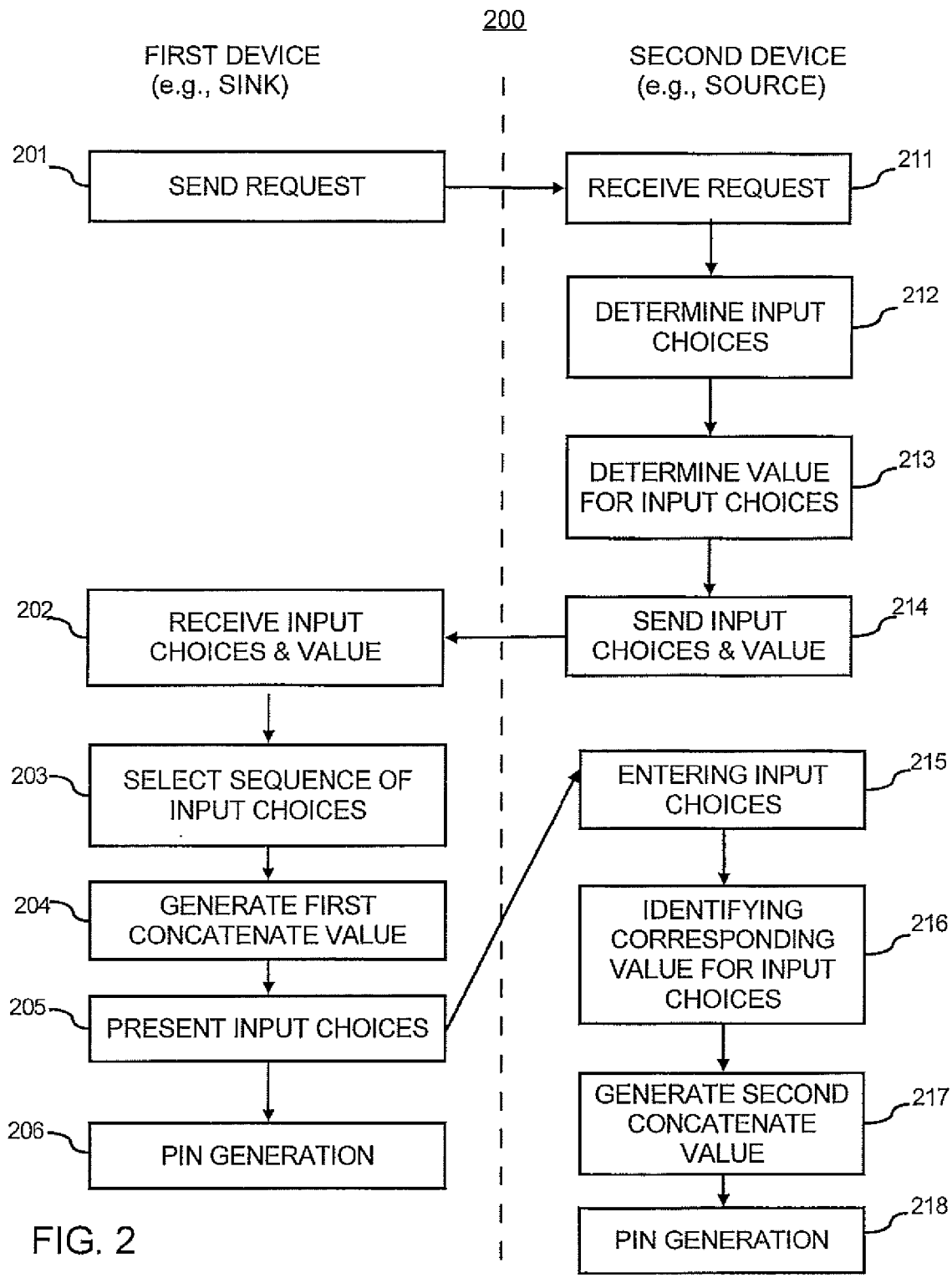
FIG. 2 illustrates a flow diagram of a method for generating and entering a PIN for a domain key between a first device and a second device in a wireless network, according to an embodiment of the present invention.

FIG. 2 illustrates a flow diagram of a method 200 for generating a PIN between a first device and a second device in a wireless network, according to an embodiment of the present invention. In one embodiment, the wireless network is a WHDI network including end user home or office devices. Therefore, in one embodiment, the first device may be the sink device 110 and the second device may be the source device 120 shown in FIG. 1, which is configured to generate a PIN.

Also, FIG. 2 shows steps performed by a first device and a second device to generate a PIN. In one embodiment, the first device is a sink device and the second device is a source device, such as the sink and source devices described with respect to FIG. 1 in a WHDI network.

At step 201, the first device sends a request to the second device. The request is a message that invokes the PIN generation method 200. Although the step 201 can be an option, the first device's certificate is sent to the second device when the first device sends a request to the second device and the second device uses the public key in the certificate to encrypt the random values for the button list in the following steps. So the encryption key may be included in the request. If the second device is already registered to the first device, the second device may reply to the first device with a message authenticated with the previously shared registration key so that the first device can recognize the second device as an option, or the second device may allow the registration process to continue and overwrite the old registration data if the new registration succeeds. If the second device is not registered to the first device, it means that the first device may not have generated a PIN for the second device previously and the second device does not have a registration key for connecting to the first device and further to the WHDI network, which the first device belongs to. When the second device is not registered to the first device, it shall proceed to the next step. In one embodiment, once the second device receives the request for the registration and replies, the second device may enable its buttons for the directed user entry mode for a predetermined period until the button(s) is pressed, otherwise it times out. During the user entry mode, the buttons shall be considered being used for that purpose only. For each WHDI source device, it is possible that the manufacturer may specify a list of buttons and button names that can be used for user entry and subsequent PIN generation.

At step 211, the second device receives the request. The received request, for example, places the second device in a user entry mode, where buttons or other manual inputs on the second device are used for PIN generation.

At step 212, the second device determines input choices, and at step 213, the second device determines values for each input choice. An input choice is information that can be input into the second device. The input choice typically is information that can be manually entered into the second device. In one example, the input choices are associated with buttons on the second device. Examples of input choices of the second device are a set of keypad or button list for function keys, such as "PLAY", "STOP", "PAUSE", and "ENTER" depends on the type of the second device. For example, a DVD player as a second device may have buttons for "PLAY", "STOP", and "PAUSE" that are input choices. In another example, a notebook PC may use keys on its keyboard as input choices. Another example of an input choice may be a number of clicks of a button. Such as 3 continuous clicks on PLAY and 2 continuous clicks on PAUSE.

A value is determined for each input choice. Each value may be a random number. Each value may be generated by the second device, for example, using a random number generator, or pre-stored in the second device, such as during the manufacture process.

In one example, the input choices and values are comprised of a button list. The button list includes a button name and value for each button of a set of buttons on the second device. One example of a button list is {(PLAY, 10), (PAUSE, 13), (STOP, 24)}.

At step 214, the second device transmits the input choices and corresponding values to the first device. The transmission can be secured, for example, by encrypting the information being transmitted, so that any other party cannot see the information. For example, when a button list is transmitted to the first device over the WHDI network, if the first device has sent its WHDI device certificate to the second device, the second device may use the first device's public key from the certificate to encrypt the input choices information. The second device may keep the input choices and corresponding values until the registration process is over.

At step 202, the first device receives the input choices and corresponding values from the second device. If the information is encrypted, the first device may decrypt it first. For example, the button list is received from the second device and the first device may use its private key to decrypt the information first.

At step 203, the first device selects a sequence of the input choices. The sequence may be selected randomly. For example, if the button list is {(PLAY, 10), (PAUSE, 13), (STOP, 24)}, the first device selects a random sequence of the buttons, such as {(STOP, 24), (PLAY, 10), (PAUSE, 13)}. The number of input choices in the sequence can be determined by the first device randomly too. Normally the number of input choices can be one or more. Also, an input choice can be repeated for multiple times or not used at all in the sequence.

At step 204, the first device generates a first concatenated value from the values in the selected sequence. The ways to concatenate the values could be many. For example, the sequence is STOP, PLAY, PAUSE. The corresponding values are 24, 10, and 13, respectively. The first concatenated value could be 241013, or the values can be concatenated in binary values, or the values can be concatenated after a transformation, such as adding a number (e.g. 5) to each value, as long as both devices do the same transformation. This step may be performed anytime after the sequence is selected.

At step 205, the first device presents only the input choices, and not both the input choices and corresponding values, in the selected sequence. In one embodiment, the presentation of the sequence may include an audio or visual presentation. For example, if the first device is a TV, the TV displays the sequence of STOP, PLAY, PAUSE. Thus, the presentation can be to a user.

At step 215, the input choices are entered in the second device. This may include manual entry. For example, the user views the displayed the sequence of STOP, PLAY, PAUSE, and pushes STOP, PLAY, PAUSE buttons in that order on the second device.

At step 216, the second device identifies the corresponding value for input choice. For example, the button list is stored in the second device and is retrieved to determine the corresponding value for each input choice.

At step 217, the second device generates a second concatenated value from the values in the sequence of the entered input choices. For example, the sequence is STOP, PLAY, PAUSE. The corresponding values are 24, 10, and 13, respectively. The second concatenated value is 241013. Also there are many ways to concatenate the values with or without transformation, as long as both devices use the same way.

The concatenated values formed at the first and second devices are the PINs. In other words, each device calculates its own PIN as represented by steps 206 and 218. If both devices generate the same PIN, then one device would be allowed to become a member of the domain or connect to the other device. There are many methods to verify whether these two devices generate the same PIN. The second device may send the PIN back to the first device securely for the first device to verify directly, or the second device may send some data derived from the PIN to the first device for the first device to verify indirectly. In one embodiment, the second device may derive a device registration key from the PIN generated by its own, or from the PIN and some other secret data shared between these two devices, and then use the derived key to generate a Message Authentication Code (MAC) over an acknowledgement message and send back to the first device. After receiving the acknowledgement message with the MAC from the second device, the first device will use the PIN generated by its own, or use the PIN with some other secret data shared between the two devices, to derive a device registration key as same as the second device did, and then use the derived key to verify the acknowledgement message's MAC. If the MAC is verified, which also means the second device has generated the right PIN to derive the right key. Thus, the PINs generated by these two devices are indirectly verified to be same. If the MAC verification failed, which means the PIN generated by the second device may not be same as the PIN the first device generated. If so, the PIN verification failed and these two devices may not be able to connect with each other to share content. The user may restart the process again to make the PIN verification successful, such that the first device and second device may effectively belong to the same domain or connect to each other, and can communicate further.

In one embodiment, the PINs are used to generate device registration keys. By verifying whether the derived keys are same, we can indirectly verify whether the PINs are same. If the device registration keys derived from the PINs match, then the first device exchanges a shared device registration key with the second device and they become registered with each other. Note that the user of an unauthorized first device would not be able to access the second device and enter the input choices to generate the same PIN on the second device using the method 200, and the user of an unauthorized second cannot initiate a registration request from the first device, so the method 200 prevents unauthorized devices from becoming registered with another device.

An embodiment of a method in which the WHDI network 100 as well as the method 200 may be employed for distributing a domain key for device registration in a domain among different WHDI devices will now be described with respect to the following flow diagram of the method 300 depicted in FIGS. 3A, 3B and 3C. It should be apparent to those of ordinary skill in the art that the method 300 represents a generalized illustration and that other steps may be added or existing steps may be removed, modified or rearranged without departing from the scopes of the method 300. In addition, the method 300 is described with respect to the WHDI network 100 and the method 200 by way of example and not limitation, and the method 300 may be performed in other types of networks that may be wired or wireless.

Figure 3A:
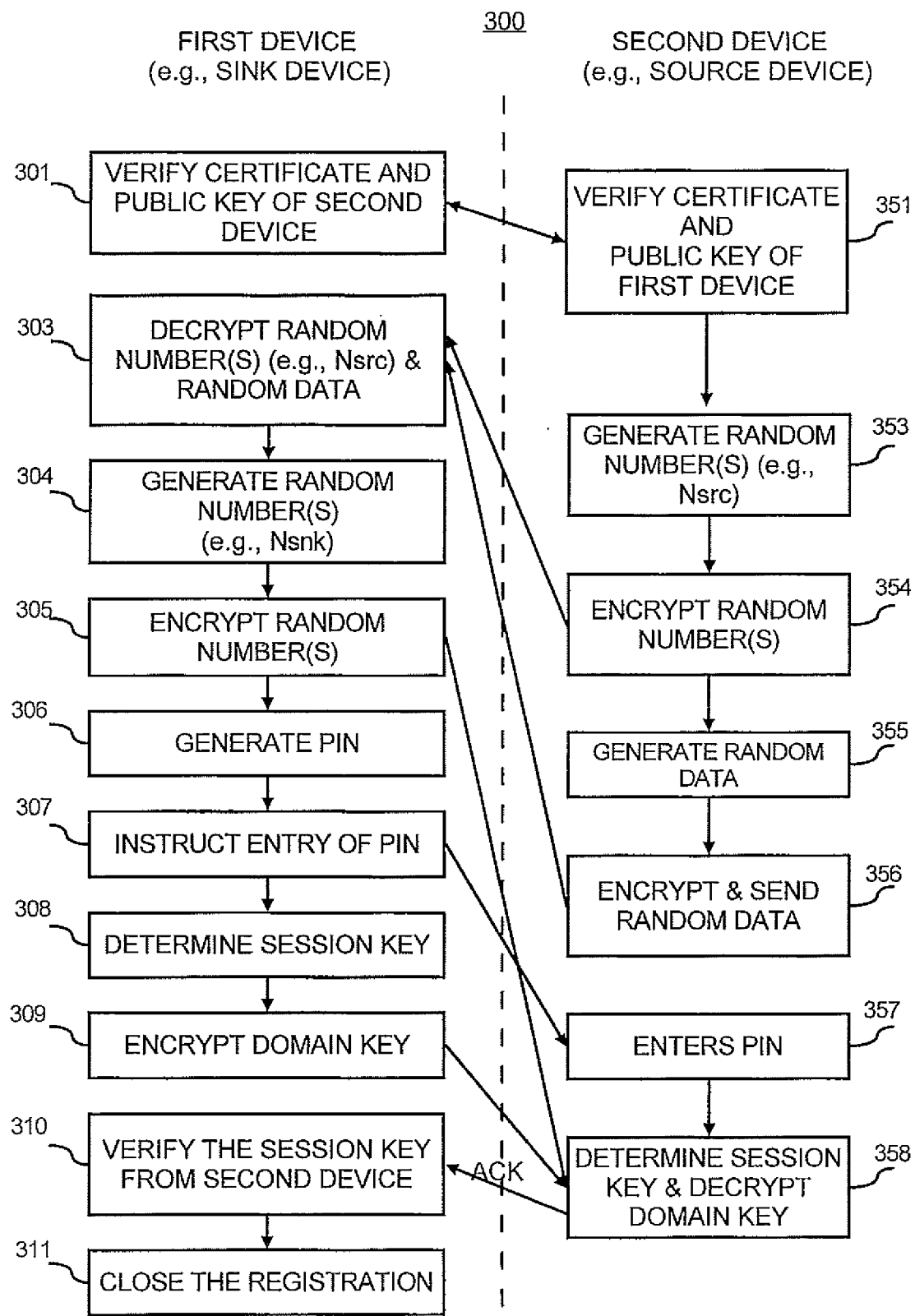
FIG. 3A illustrates a flow diagram of a method for securely delivering a domain key for device registration between a first device and a second device in a wireless network, according to an embodiment of the present invention.

FIG. 3A illustrates a flow diagram of a method 300 for securely distributing a domain key for device registration between a first device and a second device in a wireless network, according to an embodiment of the present invention. In one embodiment, the first device is the sink device 110 and the second device is the source device 120 shown in FIG. 1. In one embodiment, the sink device 110 has a domain key and will distribute the domain key securely to the source device 120. In another embodiment, the source device 120 has a domain key and will distribute the domain key securely to the sink device 110. In particular, although the flow diagrams show the first device being the sink device, in other embodiments the first device is a source device.

At steps 301 and 351, the first and second devices verify that each device is a certified WHDI device. The first device provides its valid WHDI device certificate to the second device and the second device provides its valid WHDI device certificate to the first device. At step 301, the first device verifies the certificate of the second device and at step 351, the second device verifies the certificate of the first device. Device authorization may be performed using the method 200 to determine that a device requesting to join a domain is an authorized device. After the first and second devices authenticate each other, as described above with respect to the steps 301 and 351, exchange of information for generating a PIN and a session key begins.

At steps 353, a random number is generated at the second device. This random number is referred to as Nsrc. At step 354, Nsrc is encrypted using the public key from the certificate of the first device and sent to the first device. For example, the second device transmits Nsrc over a WHDI network to the first device, and Nsrc is encrypted with the public key of the first device.

At steps 355 and 356, random data is generated at the second device, encrypted and sent to the first device. Steps 355 and 356 are optional. The random data may be used by the first device to generate a PIN, or other data may be used to generate a PIN.

At step 303, the first device decrypts Nsrc and the random data. At step 304, the first device generates a random number, referred to as Nsnk. At step 305, the first device encrypts Nsnk, for example, with the public key of the second device, and sends the encrypted Nsnk to the second device at step 305.

Alternatively, the two random numbers Nsrc and Nsnk can also be encrypted and exchanged to derive the session key using the well-known Diffie-Hellman (DH) key exchange method or some other equivalent methods, such as Elliptic Curve Diffie-Hellman (ECDH) method. In the alternative methods, the PIN can be used to derive the session key together with the exchanged shared secret using DH or ECDH. If using ECDH method, the second device generates a random ECDH private key in step 353 and calculates the corresponding ECDH public key and sends it to the first device in step 354. The first device also generates the ECDH public key pairs in Step 304 and 305. Rather than using both Nsrc and Nsnk to derive the session key together with the PIN, the first and second device may use the ECDH shared secret, which is calculated from each device's ECDH private key and the other device's ECDH public key, to derive the session key together with the PIN. The DH method can do it in a same or similar way.

At step 306, the first device generates a PIN. The PIN may be a random value. The PIN may be generated from random data received from the second device. Steps 355 and 356 describe sending the random data to the first device. In other embodiments, the PIN may be a one-time use PIN that is randomly generated by the first device, or the PIN may be the PIN generated from the concatenated values described with respect to step 217 in the method 200.

At step 307, the first device generates instructions to enter the PIN in the second device. For example, instructions are displayed that tell a user to manually enter the PIN in the second device, for example, using a keypad or remote control for the second device. The instructions may be displayed on the first device to the user.

At step 357, the PIN is entered in the second device by the user. If the second device did not generate the random value for each input choice, the first device may also securely send the values to the second device as an option. At this point, each device should have Nsrc, Nsnk, and the PIN, and each device can generate the session key on its own using this information and the same key generation function. At step 308, the first device generates a session key using a key generation function, F, where session key=F(Nsrc, Nsnk, PIN). The second device stores the same function F and generates the same session key using F(Nsrc, Nsnk, PIN). At step 309, if it is the second device trying to join the domain that the first device belongs to, the first device encrypts a domain key using the session key, and sends the encrypted domain key to the second device. Note that this is the secure transmission of the domain key to the second device using the session key. If it is the first device trying to join the domain that the second device belongs to, the second device will encrypt the domain key using the session key and sends the encrypted domain key to the first device, and the first device will decrypt it using the same session key. The security of the transmission is improved by the use of three random values, including a one-time used PIN, which makes it more difficult for an unauthorized user to generate the session key and get the domain key. When an attacker is using the first device trying to register with the second device, if the user of the second device does not input the PIN at the second device, the registration will not complete. When the attacker is using the second device to register with the first device, it is even harder because the second device cannot start the registration process. As the PIN is used only once, the attacker cannot use one device to get the PIN and apply to another device without being authorized by the user, and also the attacker cannot use the brute force attack to break the PIN because it keeps changing. Please note that, it is optional for the PIN to be generated from the random data from the second device. The value for each input choice for the PIN may be pre-assigned. It is also optional for the PIN be involved in the session key derivation, if we can verify the PIN separately before sending the domain key.

At step 358, the second device decrypts the domain key using the session key it generated. The second device can decrypt the domain key only if it generated the same session key as the first device. The second device sends an acknowledgement message (ACK) to the first device, which indicates that the second device is able to decrypt the domain key. At step 310, the first device receives the ACK to verify that the second device has the correct session key to decrypt the domain key. Now the second device can present the domain key to join the domain of the first device. The registration may then be closed at step 311.

Figure 3B:
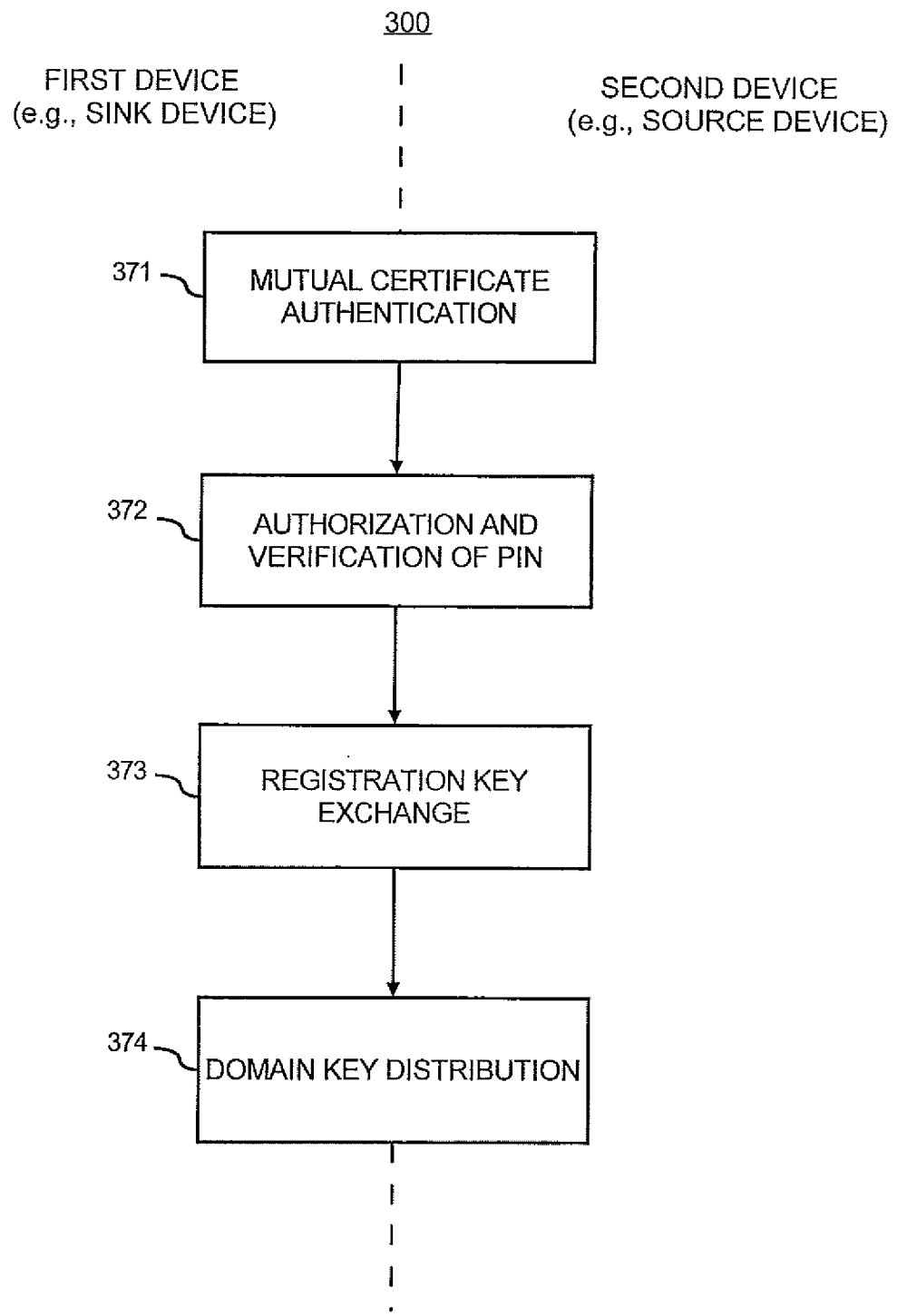
FIG. 3B illustrates a flow diagram of a simplified method for secure and efficient domain key distribution for device registration between a first device and a second device in a wireless network, according to an embodiment of the present invention.
Figure 3C:
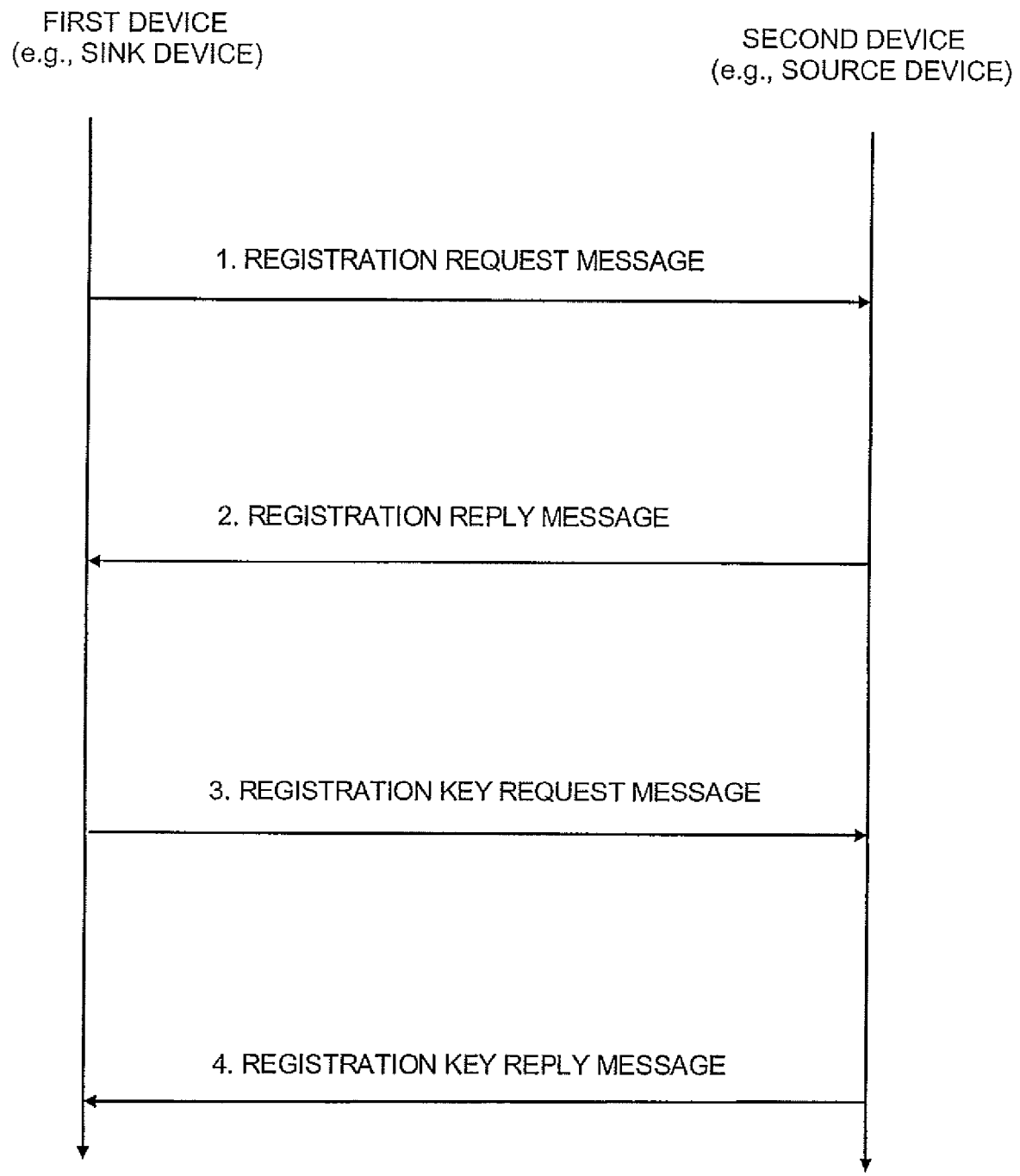
FIG. 3C illustrates a flow diagram of transactions of the protocol of distributing the domain key during device registration, according to an embodiment of the present invention.

FIG. 3B illustrates a flow diagram of a simplified method for secure and efficient domain key distribution for device registration between a first device and a second device in a wireless network, according to an embodiment of the present invention. The steps of method 300 as described in FIG. 3A is simplified into the four simple functions as shown in FIG. 3B. At step 371, the first device and the second device accomplishes mutual certificate authentication. At step 372, the first device and the second device generate one-time use PIN and verify the one-time use PIN. At step 373, the first device and the second device exchange the registration key with each other. Finally, at step 374, the first device or the second device distribute the domain key. Thus, the method 300 accomplishes mutual certificate authentication, authorization PIN verification, registration key exchange and domain key distribution.

The method for secure and efficient domain key distribution for device registration between a first device and a second device in a wireless network can be ingeniously fit into very few transactions, according to an embodiment of the present invention. FIG. 3C illustrates one embodiment of the transactions of the protocol of distributing the domain key during device registration using method 300. In the first transaction of Registration Request Message, which is sent from the first device to the second device, the first device sends its WHDI certificate and registration request mode to the second device. If it's requesting for the Source-Domain mode or Sink-Domain mode registration, the domain name of the source device domain or the sink device domain will be included respectively.

In the second transaction of Registration Reply Message, which is sent from the second device to the first device, the second device sends its WHDI certificate, a random number Nsrc and a list of input choices to the first device. The list of input choices may include a list of input choices and a random value for each input choice. The random number and the input choices list may be encrypted using the public key got from the first device's certificate.

In the third transaction of Registration Key Request Message, which is sent from the first device to the second device, the first device sends a random number Nsnk back to the second device. As an option, the received Nsrc may be sent together with Nsnk for the second device to identify the transaction. These random numbers may be encrypted using the second device's public key got from the second device's certificate. If it's a Sink-Domain mode registration, the first device may also send the domain key of the sink device's domain to the second device encrypted using the device registration key derived from the random numbers Nsrc and Nsnk and the PIN generated from the sequence of the input choices. Before deriving the device registration key, the first device also determines the PIN and instructs the user to enter the input choices at the second device using the PIN generation method 200. This message is also signed using the device registration key as a Message Authentication Code (MAC) key. This generated MAC can be used by the second device to verify whether it generates the right PIN and derives the right device registration key.

In the fourth transaction of Registration Key Reply Message, which is sent from the second device to the first device, the second device sends back an acknowledge message with a MAC generated using the device registration key that the second device derived from the PIN generated from the user's manual input following the instructions that the first device instructed the user. The first device may use its own derived device registration key to verify the MAC to make sure the second device got the right PIN and later the two devices are registered. If the registration is a Source-Domain mode registration, the domain key of the source device's domain will be encrypted using the second device's derived device registration key and sent to the first device. Therefore, these four transactions accomplished all four functions described in FIG. 3B securely and efficiently. As described, the method 300 greatly improves the efficiency of the data transmission and reduces the number of transactions. Although the encrypted domain key may be distributed before the session key exchange is completed, it's still secure enough to protect the domain key because the PIN is one-time use random PIN and it is delivered through out-of-band channel, so it is very difficult to attack. If it is not required for some reason, e.g. the device may be authenticated by some other device certificates, the certificate verification step could be optional in this method.

Figure 4:
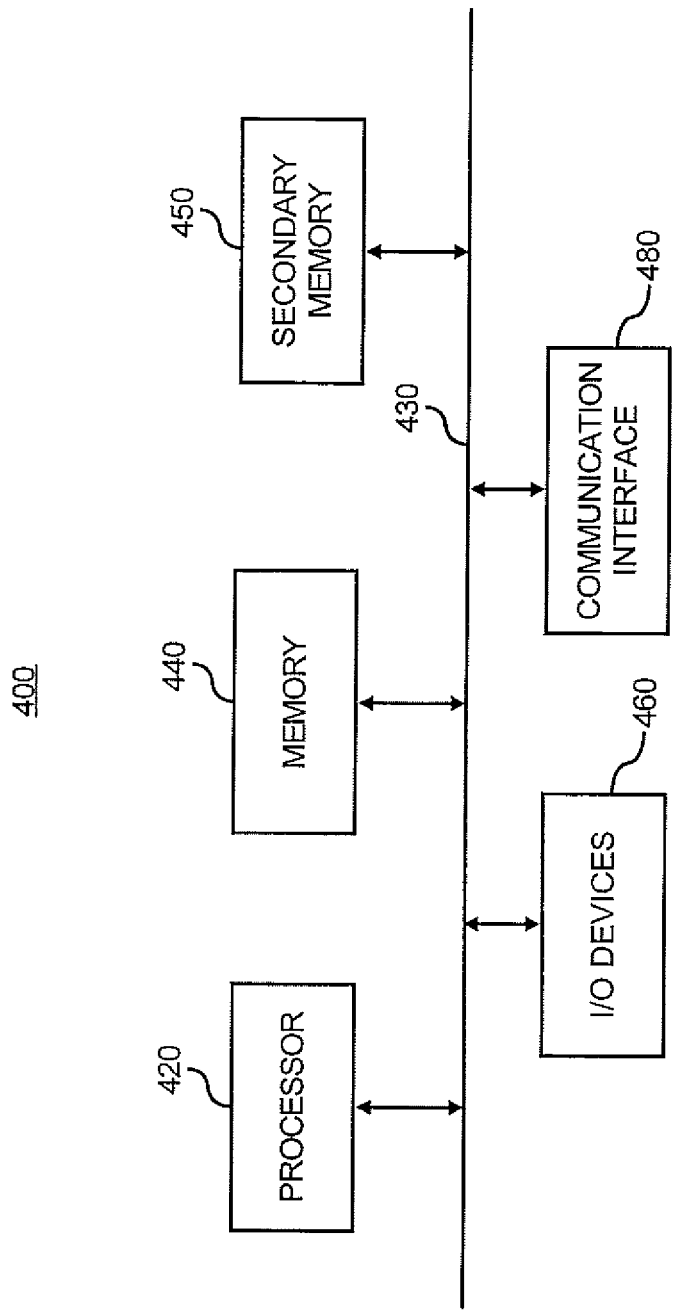
FIG. 4 shows a block diagram of a computer system that may be used as a platform for devices shown in FIG. 1, according to an embodiment of the present invention.

FIG. 4 shows the block diagram of a computer system 400 that may be used as a platform for a first device, second device, source device, or a sink device. The computer system 400 may also be used to execute one or more computer programs performing the methods, steps and functions described herein. The computer programs are stored in computer readable mediums.

The computer system 400 includes a processor 420, providing an execution platform for executing software. Commands and data from the processor 420 are communicated over a communication bus 430. The computer system 400 also includes a main memory 440, such as a Random Access Memory (RAM), where software may reside during runtime, and a secondary memory 450. The secondary memory 450 may include, for example, a nonvolatile memory where a copy of software is stored. In one example, the secondary memory 450 also includes ROM (read only memory), EPROM (erasable, programmable ROM), EEPROM (electrically erasable, programmable ROM), and other data storage devices, include hard disks.

The computer system 400 includes I/O devices 460. The I/O devices may include a display and/or user interfaces comprising one or more I/O devices, such as a keyboard, a mouse, a stylus, speaker, and the like. A communication interface 480 is provided for communicating with other components. The communication interface 480 may be a wired or a wireless interface. The communication interface 480 may be a network interface.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method of transferring a domain key between a first device and a second device in a network, the method comprising:
   verifying the second device is an authorized device through certificates, wherein the second device verifies the first device is an authorized device though the certificates;
   receiving, at the first device, a first random number from the second device, wherein the first random number is encrypted;
   determining a second random number at the first device; sending the second random number from the first device to the second device;
   generating a Personal Identification Number (PIN) at the first device;
   in response to generating the PIN, outputting instructions, by the first device, that instruct a user entry of the PIN in the second device, wherein the PIN is generated and the instructions are output after the verifying;
   generating a session key from the first random number, the second random number, and the PIN; and
   sending the domain key encrypted with the session key from the first device to the second device or receiving the domain key encrypted with the session key from the second device to the first device.

2. The method of claim 1, further comprising:
   allowing one of the first device or the second device to join a domain of the second device or the first device, respectively, and if the second device generates a same session key as the first device, the second device is operable to use the session key to encrypt and decrypt the domain key from the first device.

3. The method of claim 1, wherein the second device uses a manually-entered PIN to verify the first device or the second device is an authorized device, wherein the first device or the second device is introduced to the network.

4. The method of claim 1, wherein verifying the second device and the first device are authorized devices comprises:
   exchanging certificates between the first and second device to verify the second device and the first device are authorized devices.

5. The method of claim 1, wherein the first random number received from the second device is encrypted using a public key of the first device, and the method further comprises:
   decrypting the first random number for use in session key generation.

6. The method of claim 1, wherein sending the second random number from the first device to the second device further comprises:
   encrypting the second random number using a public key of the first device; and
   sending the encrypted second random number to the second device, wherein the second device decrypts the second random number using a private key of the second device to generate the session key.

7. The method of claim 1, wherein the PIN is a random value.

8. The method of claim 1, wherein the PIN is a previously assigned non-random value.

9. The method of claim 7, wherein determining the PIN further comprises:

determining the PIN from random data received from the second device.

10. The method of claim 1, wherein the PIN is manually entered in the second device, and the manually-entered PIN is used by the second device to generate the session key.

11. The method of claim 1, wherein the first device and the second device comprise a sink device and a source device or two source devices in a Wireless Home Digital Interface (WHDI) network.

12. The method of claim 1, wherein the first device and the second device comprise two source devices in a Wireless Home Digital Interface (WHDI) network.

13. A non-transitory computer readable storage medium storing at least one computer program that when executed performs a method of transferring a domain key during a device registration between a first device and a second device in a network, the method comprising:
   verifying the second device is an authorized device through an exchange of certificates, wherein the second device verifies the first device is an authorized device though the exchange of certificates;
   receiving, at the first device, a first random number from the second device, wherein the first random number is encrypted;
   determining a second random number at the first device;
   sending the second random number from the first device to the second device;
   generating a Personal Identification Number (PIN) at the first device;
   in response to generating the PIN, outputting instructions, by the first device, that instruct a instructing user entry of the PIN in the second device, wherein the PIN is generated and the instructions are output after the verifying;
   generating a session key from the first random number, the second random number, and the PIN; and
   sending the domain key encrypted with the session key from the first device to the second device or receiving the domain key encrypted with the session key from the second device to the first device.

14. The non-transitory computer readable storage medium of claim 13, the method further comprises:
   allowing one of the first device or the second device to join a domain of the second device or the first device, respectively, and if the second device generates a same session key as the first device, the second device is operable to use the session key to encrypt and decrypt the domain key from the first device.

15. The non-transitory computer readable storage medium of claim 13, wherein the second device uses a manually-entered PIN in the second device to verify the first device or the second device is an authorized device, wherein the first device or the second device is introduced to the network.

16. The non-transitory computer readable storage medium of claim 13, wherein the method of verifying the second device and the first device are authorized devices further comprises:
   exchanging certificates between the first and second device to verify the second device and the first device are authorized devices.

17. The non-transitory computer readable storage medium of claim 13, wherein the first random number received from the second device is encrypted using a public key of the first device, and the method further comprises:
   decrypting the first random number for use in session key generation.

18. The non-transitory computer readable storage medium of claim 13, wherein the method of sending the second random number from the first device to the second device further comprises:
   encrypting the second random number using a public key of the first device; and
   sending the encrypted second random number to the second device, wherein the second device decrypts the second random number using a private key of the second device to generate the session key.

19. The non-transitory computer readable storage medium of claim 13, wherein the method of determining the PIN further comprises:
   determining the PIN from random data received from the second device.

20. A device configured to communicate with a new device in a wireless network, the device comprising:
   an interface configured to wirelessly transfer a domain key to the new device, wherein the domain key is encrypted at the device and is decrypted at the new device;
   a processor configured to:
      verifying the new device is an authorized device through an exchange of certificates, wherein the new device verifies the device is an authorized device though the exchange of certificates,
      receiving a first random number from the new device, wherein the first random number is encrypted,
      determining a second random number,
      sending the second random number to the new device,
      randomly generate a PIN,
      in response to generating the PIN, outputting instructions that instruct a user entry of the PIN in the new device, wherein the PIN is generated and the instructions are output after the verifying,
      derive a session key of the device from the first random number, the second random number, and the PIN, and
      exchange the session key of the device with a session key of the new device, and verify the session key of the new device,
      send the domain key encrypted with the session key to the new device or receiving the domain key encrypted with the session key from the new device;
   and
   a data storage storing the PIN, the session keys and the domain key.

* * * * *